US011968514B2

(12) United States Patent
Xiao et al.

(10) Patent No.: US 11,968,514 B2
(45) Date of Patent: Apr. 23, 2024

(54) VIBRATION SOUNDING DEVICE

(71) Applicant: AAC Microtech (Changzhou) Co., Ltd., Changzhou (CN)

(72) Inventors: Bo Xiao, Shenzhen (CN); Chenliang Kong, Shenzhen (CN); Tong Zhang, Shenzhen (CN); Ronglin Linghu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 200 days.

(21) Appl. No.: 17/833,888

(22) Filed: Jun. 6, 2022

(65) Prior Publication Data

US 2023/0239629 A1 Jul. 27, 2023

(30) Foreign Application Priority Data

Jan. 27, 2022 (CN) ......................... 202220222354.0

(51) Int. Cl.
*H04R 9/06* (2006.01)
*H04R 1/02* (2006.01)
*H04R 9/02* (2006.01)
*H04R 9/04* (2006.01)

(52) U.S. Cl.
CPC ............... *H04R 9/06* (2013.01); *H04R 1/025* (2013.01); *H04R 9/025* (2013.01); *H04R 9/045* (2013.01); *H04R 2499/11* (2013.01)

(58) Field of Classification Search
CPC .......... H04R 9/06; H04R 1/025; H04R 9/025; H04R 9/045; H04R 2499/11
See application file for complete search history.

(56) References Cited

U.S. PATENT DOCUMENTS

| | | | | |
|---|---|---|---|---|
| 6,332,029 | B1 * | 12/2001 | Azima | H04R 1/021<br>381/337 |
| 2018/0220238 | A1 * | 8/2018 | Zhu | H04R 9/025 |
| 2019/0151896 | A1 * | 5/2019 | Takahashi | B06B 1/045 |
| 2020/0200995 | A1 * | 6/2020 | Lee | G02B 7/08 |
| 2022/0226188 | A1 * | 7/2022 | Camozzi | A61H 23/0245 |
| 2022/0279281 | A1 * | 9/2022 | Liu | H04R 9/06 |
| 2023/0217179 | A1 * | 7/2023 | Liu | H04R 7/18<br>381/345 |

* cited by examiner

*Primary Examiner* — Suhan Ni
(74) *Attorney, Agent, or Firm* — W&G Law Group

(57) ABSTRACT

The application relates to a vibration sounding device including: a housing body with a containment cavity and a sounding unit arranged in the containment cavity. The sounding unit includes a vibration system and a magnetic circuit system. The magnetic circuit system includes a main magnet and a secondary magnet assembly. The vibration sounding device also includes an elastic assembly, a weight assembly, and a drive coil. The second direction is perpendicular to the first direction. By virtue of the configuration, it is beneficial to simplify the forming process of the weight assembly, reduce the production cost, and also facilitate the replacement of the drive coil.

10 Claims, 6 Drawing Sheets

VIBRATION SOUNDING DEVICE

FIELD OF THE PRESENT DISCLOSURE

The invention relates to the technical field of electro-acoustic transducers, in particular to a vibration sounding device.

DESCRIPTION OF RELATED ART

With the development of communication technology and the continuous update of consumer demand, in electronic equipment such as mobile phones, tablet computers, smart bracelets, etc., the methods of incoming call prompts, incoming letter prompts, message prompts and operation prompt mainly include sound prompts and vibration prompts. In the existing electronic equipment, an integrated sounding device with two structures of speaker and vibration motor is usually provided to undertake these two prompting methods.

Existing integrated sounding devices usually include a vibration system, a magnetic circuit system, a drive coil and a weight. Wherein, the drive coil drives the weight to vibrate under the action of the magnetic circuit system to realize the vibration prompt, and the vibration system vibrates and emits sound under the action of the magnetic circuit system to realize the sound prompt. However, the existing weights are usually made by powder sintering, and the thickness of the weights is relatively large, which leads to complicated molding processes and high production costs.

SUMMARY OF THE PRESENT INVENTION

The purpose of the present invention is to provide a vibration sounding device which integrates the function of the vibration motor into the speaker for reducing the number of parts.

Accordingly, the present invention provides a vibration sounding device, comprising: a housing body with a containment cavity; a vibration system; and a magnetic circuit system for driving the vibration system to move in a first direction. The magnetic circuit system includes a main magnet and a secondary magnet assembly surrounding the main magnet for forming a magnetic gap. The vibration sounding device further includes a sounding unit formed by the vibration system and the magnetic circuit system, an elastic assembly accommodated in the containment cavity and fixedly connected to the housing body, a weight assembly connected to and suspended by the elastic assembly in the containment cavity, and a drive coil fixed to the weight assembly and being movable along a second direction together with the weight assembly, the second direction being perpendicular to the first direction.

The weight assembly includes a first weight with an accommodation cavity and a second weight set in the accommodation cavity; the second weight includes an installation slot for accommodating the drive coil; and both the first weight and the second weight are sheet stamping parts.

Optionally, the material of the first weight and/or the second weight is stainless steel or brass.

In an optional embodiment, the elastic assembly includes a first elastic component and a second elastic component; the first weight includes a first side wall and a second side wall oppositely disposed in the second direction; the housing body includes a first inner wall and a second inner wall oppositely disposed in the second direction; and, the first side wall is close to the first inner wall, and the second side wall is close to the second inner wall.

The first elastic component is connected between the first side wall and the first inner wall, and the second elastic component is connected between the second side wall and the second inner wall.

The first side wall includes a first side surface and a second side surface; the first side surface and the second side surface are directly connected or indirectly connected along a third direction perpendicular to the first and second directions; along the third direction, a distance between the first side surface and the first inner wall gradually decreases, and a distance between the second side surface and the first inner wall gradually increases.

And/or, the second side wall includes a third side surface and a fourth side surface; the third side surface and the fourth side surface are directly connected or indirectly connected along a third direction perpendicular to the first direction and the second direction; along the third direction, a distance between the third side surface and the second inner wall gradually decreases, and a distance between the fourth side surface and the second inner wall gradually increases.

Optionally, at least one gap is formed in the first side wall and/or the second side wall.

The second weight includes a motherboard part formed with the installation slot, and two side panel parts extending from both ends of the motherboard part along the third direction toward the sounding unit.

The secondary magnet assembly includes two first secondary magnets spaced along the second direction and two second secondary magnets spaced along the third direction; in the third direction, two of the second secondary magnets are located between the two side panel parts, respectively.

The drive coil includes a first side edge and a second side edge which are oppositely arranged along the second direction; and in the first direction, the first side edge and the main magnet are relatively spaced apart, and the second side edge and the first secondary magnet are relatively spaced apart.

The magnetic circuit system further includes a magnetic yoke, and the magnetic yoke is fixedly connected to two of the second secondary magnets and the main magnet along the third direction; and an avoidance slot is opened on the motherboard part, and in the first direction, at least part of the magnetic yoke is located in the avoidance slot.

The multifunctional sounding further includes an installation plate connected to the housing body. The magnetic circuit system further includes a main pole core attached to the main magnet and a secondary pole core surrounding the main pole core and attached to the first secondary magnet and the second secondary magnet.

The secondary pole core includes a main body part and two connection parts extending from both ends of the main body part along the second direction in a direction away from the main body part; the connection part is fixed on the installation plate.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

The vibration sounding device disclosed in the embodiment of the application can be, but is not limited to, a smart phone, a tablet computer, a notebook computer, an Ultra mobile personal computer (UMPC), a handheld computer, a walkie-talkie, a netbook, a point of sale (Point of sales, POS for short), personal digital assistant (PDA), wearable equipment, virtual display equipment, wireless U disk, Bluetooth audio/headphone, vehicle front-mounted, driving recorder, security equipment and other electronic equipment.

For the convenience of description, the following embodiment is described by taking a smart phone as an example of electronic equipment of the application-embodiment.

Figure 1:
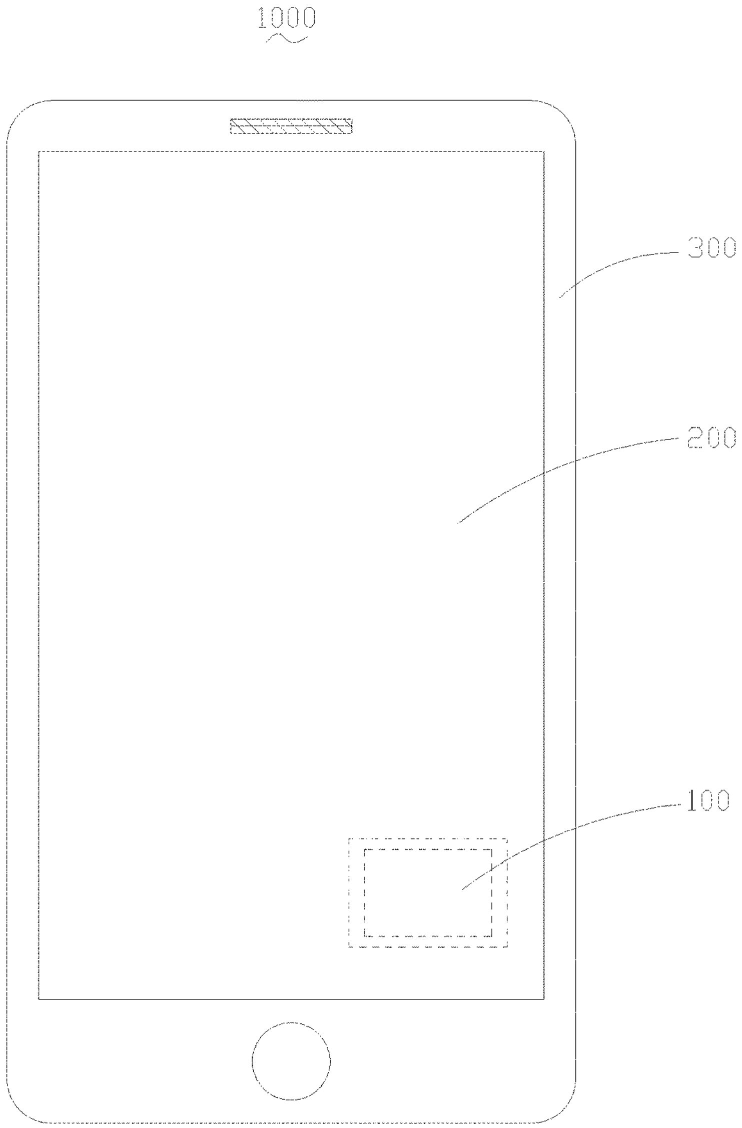
FIG. 1 is a front view of a smart phone using a vibration sounding device in accordance with an embodiment of the present invention.
Figure 2:
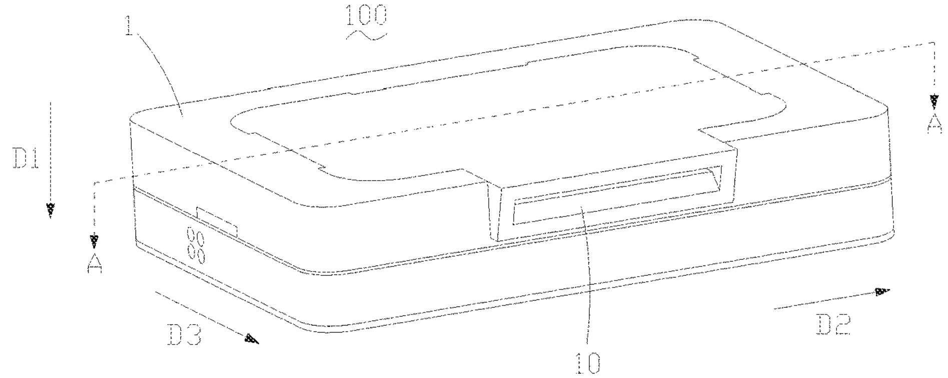
FIG. 2 is an isometric view of the vibration sounding device.

Please refer to FIG. 1, the smart phone 1000 includes a housing 300, a screen assembly 200, a vibration sounding device 100, and other necessary electronic devices such as a processor, a motherboard, a memory unit, and a battery (not shown in FIG. 1).

An interior space (not shown in the FIG. 1) for accommodating electronic devices such as the vibration sounding device 100 is formed in the housing 300, and the screen assembly 200 is disposed on the user-facing side of the housing 300 (the operation side of the smart phone 1000) and closes the interior space. The vibration sounding device 100 can emit corresponding sounds and vibrations according to the user's touch commands on the screen assembly 200. Or, when the smart phone 1000 receives an incoming call, letter, message, the vibration sounding device 100 can also emit corresponding sound and vibration.

Please refer to FIGS. 2-9, the embodiment of the application provides a vibration sounding device 100, including: a housing body 1 having a containment cavity (not shown) and a sounding unit 2 provided within the containment cavity and separating the containment cavity to form a front cavity and a rear cavity. The housing body 1 is provided with a sound exit hole 10 that is connected with the front cavity to achieve sound output; the rear cavity can be filled with sound absorbing powder to improve the low-frequency acoustic performance of the vibration sounding device 100.

The sounding unit 2 includes a vibration system 21 and a magnetic circuit system 22 that drives the vibration system 21 to vibrate and sound in the first direction D1. The magnetic circuit system 22 includes a main magnet 221 and a secondary magnet assembly 222 disposed around the main magnet 221 to form a magnetic gap 220. The vibration system 21 includes a voice coil 211 inserted in the magnetic gap 220. the voice coil 211 vibrates under the action of the main magnet 221 and the secondary magnet assembly 222 to realize the vibration of the entire vibration system 21, thereby realizing the sound prompting function of the vibration sounding device 100. The first direction D1 is the thickness direction of the vibration sounding device 100.

Figure 3:
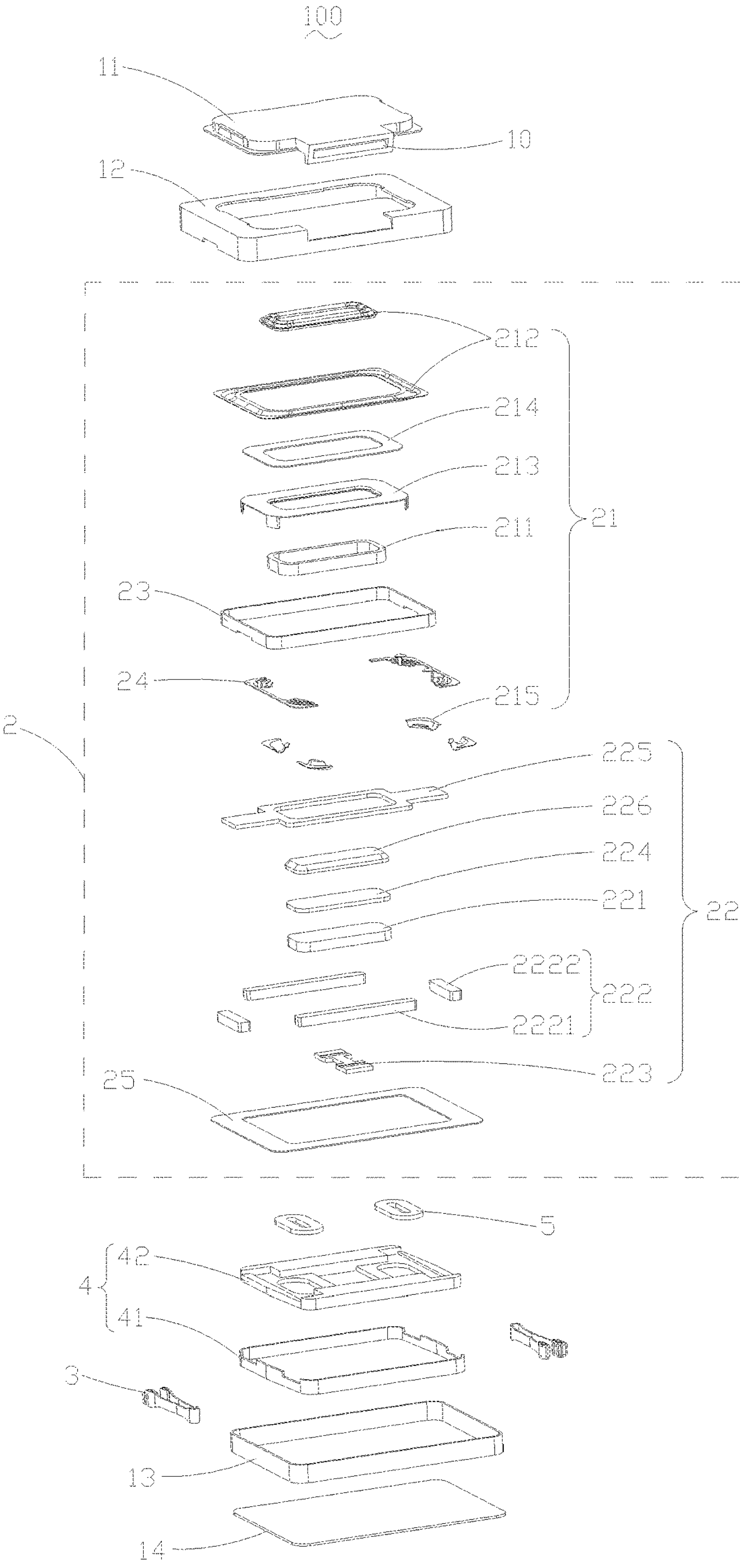
FIG. 3 is an exploded view of the vibration sounding device shown in FIG. 2.

Referring to FIG. 3, the housing body 1 includes a first frame body 12, a second frame body 13, an upper cover 11 covering the upper side of the first frame body 12, and a lower cover 14 covering the lower side of the second frame body 13. The first frame body 12, the second frame body 13, the upper cover 11 and the lower cover 14 are jointly enclosed to form a containment cavity. The sound exit hole 10 is opened on the side wall of the upper cover 11 to realize the sound from the side surface of the vibration sounding device 100.

Please refer to FIG. 3, FIG. 4, FIG. 8 and FIG. 9. In order to realize the vibration prompting function of the vibration sounding device 100, the vibration sounding device 100 further includes an elastic assembly 3, a weight assembly 4 and a drive coil 5. The elastic assembly 3 is set in the containment cavity and fixedly connected with the housing body 1. The weight assembly 4 is connected to the elastic assembly 3 to be suspended in the containment cavity. The drive coil 5 is fixed to the weight assembly 4 and vibrates in the second direction D2 together with the weight assembly 4. Wherein, the second direction D2 is perpendicular to the first direction D1, and the second direction D2 is the length direction of the vibration sounding device 100.

In the present invention, the weight assembly 4 is suspended in the containment cavity through the elastic assembly 3, and then the drive coil 5 is fixed on the weight assembly 4. The weight assembly 4 will vibrate along the second direction D2 perpendicular to the first direction D1 along with the drive coil 5 under the interaction of the main magnet 221, the secondary magnet assembly 222 and the drive coil 5. That is, the entire drive coil 5 and weight assembly 4 are used as a mover, and the sounding unit 2 with main magnet 221 and secondary magnet assembly 222 is used as a stator, and the two functions of sound prompting and vibration prompting are integrated into a vibration sounding device 100. It is beneficial to reduce the number of parts and components in the electronic equipment, thereby facilitating the design of miniaturization, lightness and thinness of the electronic equipment.

Figure 4:
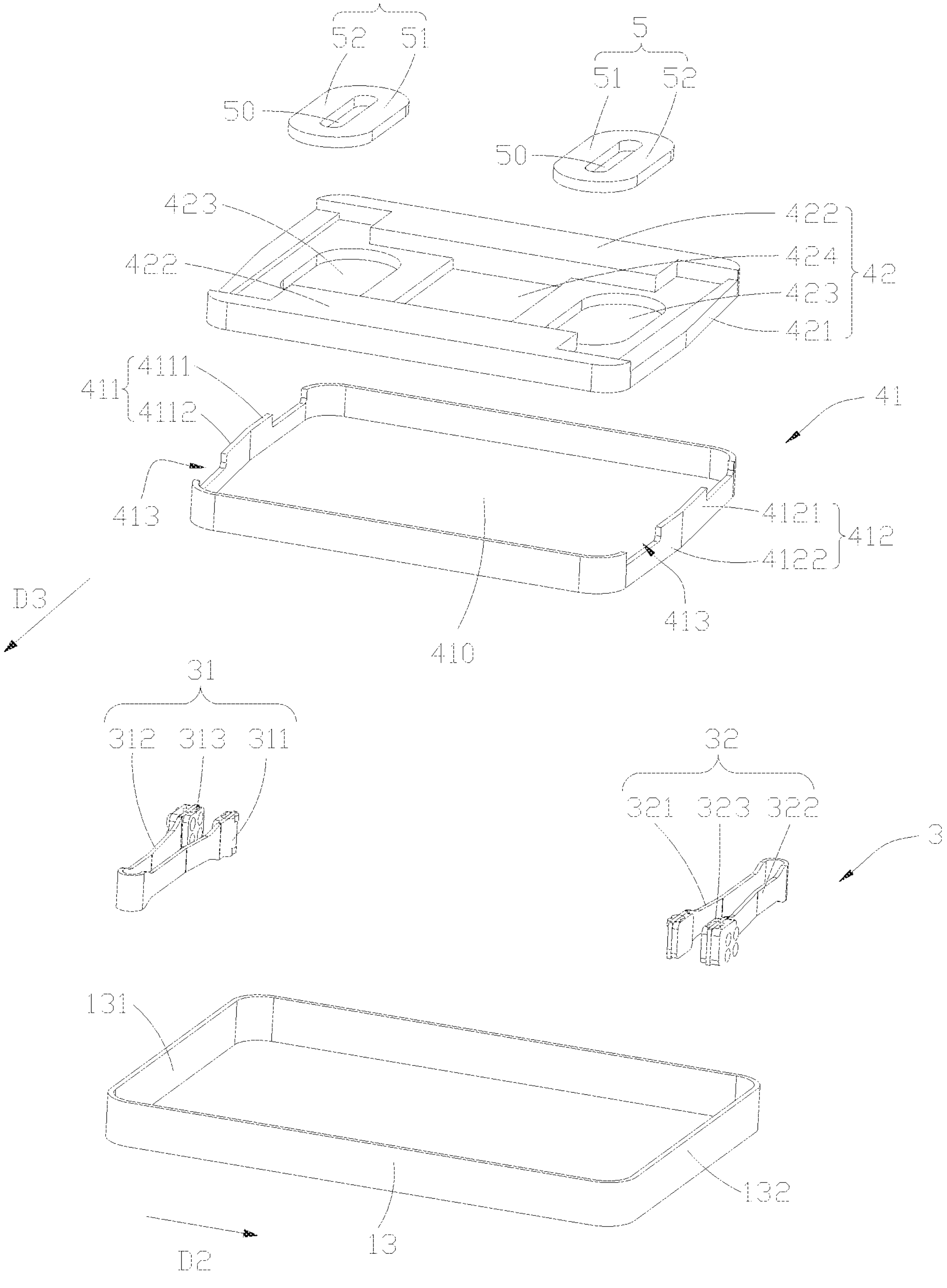
FIG. 4 is a partially exploded view of the vibration sounding device shown in FIG. 3.

See FIG. 4, the weight assembly 4 includes a first weight 41 and a second weight 42. The first weight 41 includes an accommodation cavity 410. The second weight 42 is set in the accommodation cavity 410. The second weight 42 also includes an installation slot 423. The drive coil 5 is accommodated in the installation slot 423, and the first weight 41 and the second weight 42 are both sheet metal stamping parts.

Specifically, both the first weight 41 and the second weight 42 are made by sheet stamping. Compared with the existing weight made by powder sintering, the forming process is simpler and the cost is reduced.

In addition, since the second weight 42 is accommodated in the accommodation cavity 410 opened by the first weight 41, when the drive coil 5 needs to be replaced, it is only necessary to take out the second weight 42 from the accommodation cavity 410, and then take the coil out of the installation slot 423 opened by the second weight 42. It is not needed to take out the first weight 41 and the second weight 42 as a whole, which facilitates the replacement of the drive coil 5.

In some embodiments, the material of the first weight 41 and/or the second weight 42 is any other non-ferromagnetic material such as stainless steel or brass. For example, the material of the first weight 41 may be stainless steel, and the material of the second weight 42 may be brass. Alternatively, the material of the first weight 41 is brass, and the material of the second weight 42 is stainless steel. Alternatively, both the first weight 41 and the second weight 42 are made of stainless steel. Alternatively, both the first weight 41 and the second weight 42 are made of brass.

Since stainless steel and brass are not ferromagnetic, the first weight 41 and the second weight 42 will not be magnetically attracted by the magnetic circuit system 22 in the sounding unit 2. Thereby, the vibration of the first weight 41 and the second weight 42 along the second direction D2 is avoided, and the vibration effect of the weight assembly 4 is improved.

Figure 8:
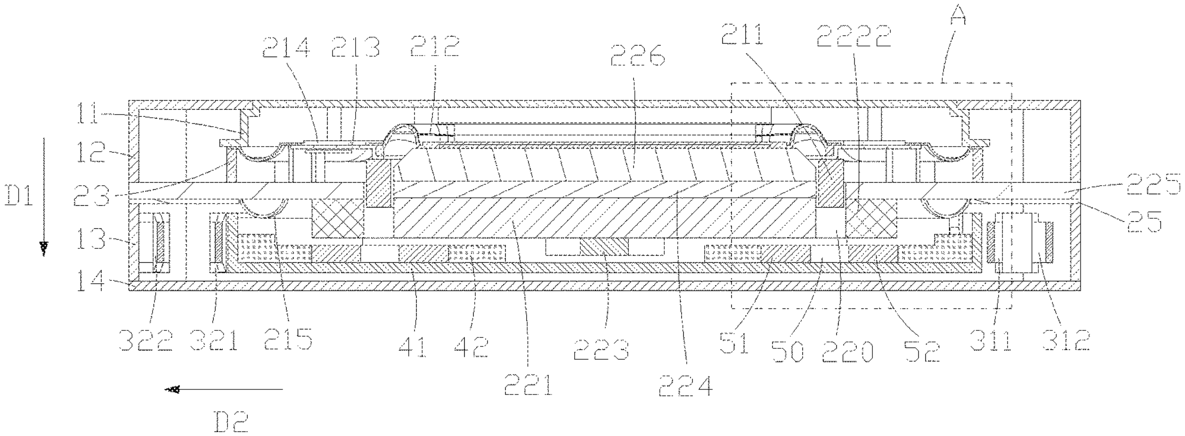
FIG. 8 is a cross-sectional view of the vibration sounding device shown in FIG. 2 taken along line AA.
Figure 9:
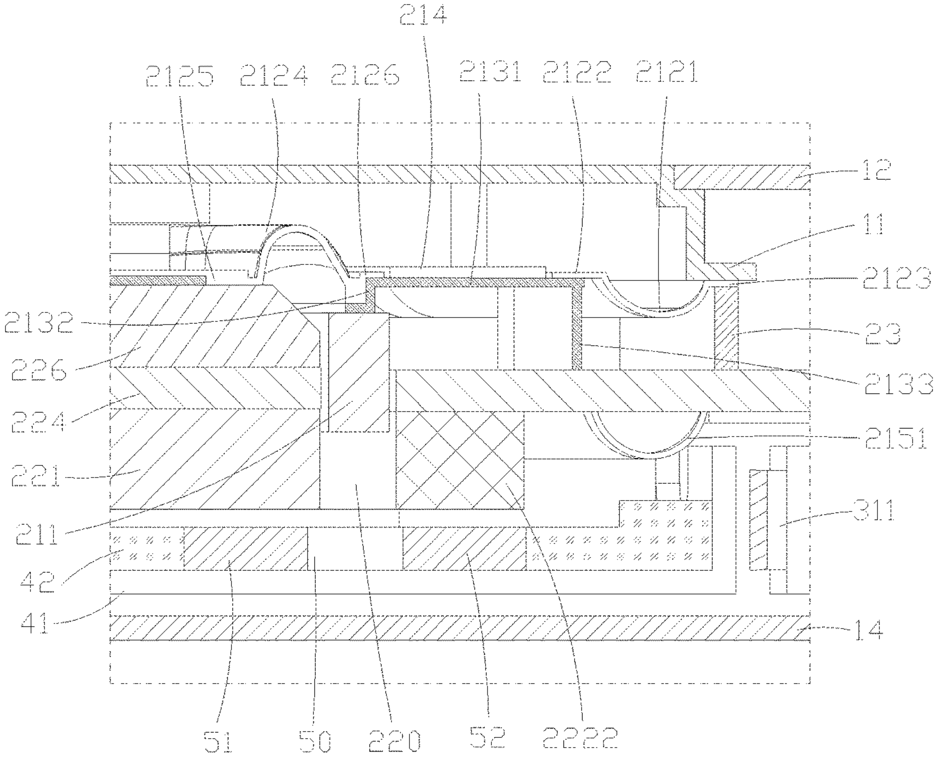
FIG. 9 is a partially enlarged view of the vibration sounding device shown in FIG. 8.

In some embodiments, see FIG. 4, FIG. 8 and FIG. 9, the drive coil 5 includes a first side edge 51 and a second side edge 52 disposed oppositely along the second direction D2. And in the first direction D1, the first side edge 51 and the main magnet 221 are relatively spaced apart, and the second side edge 52 and the secondary magnet assembly 222 are relatively spaced apart. The first side edge 51 and the second side edge 52 are jointly enclosed to form a wire winding hole 50. And on the first direction D1, the wire winding hole 50 is set directly opposite to the magnetic gap 220, the relative positional relationship between drive coil 5 and main magnet 221 and secondary magnet assembly 222 is optimized. the interaction force between the drive coil 5 and the main magnet 221 and the secondary magnet assembly 222 increases, the vibration performance of the vibration sounding device 100 improves.

Wherein, the number of the drive coils 5 may be one, two or any other number, which is not limited here. Exemplarily, as shown in FIG. 4, the number of the drive coils 5 may be two. The two drive coils 5 are fixed to the weight assembly 4 at symmetrical intervals along the second direction D2. By increasing the number of drive coils 5 in a limited space, the opposing area between the drive coil 5 and the main magnet 221 and the opposing area between the drive coil 5 and the secondary magnet assembly 222 can be increased. Thus, the interaction force between the drive coil 5 and the main magnet 221 and the secondary magnet assembly 222 is increased. In addition, since the two drive coils 5 are distributed on both sides of the weight assembly 4 along the second direction D2, the weight assembly 4 is simultaneously subjected to the driving force provided by the magnetic field on both sides along the second direction D2. It is beneficial to avoid the phenomenon of torque deflection caused by the asymmetric action of the driving force, and avoid the problem of sinking of the weight assembly 4 caused by the magnetic attraction.

In some embodiments, see FIG. 4, FIG. 8 and FIG. 9, elastic assembly 3 includes first elastic component 31 and second elastic component 32. The first weight 41 includes a first side wall 411 and a second side wall 412 oppositely disposed along the second direction D2. The housing body 1 includes a first inner wall 131 and a second inner wall 132 oppositely disposed along the second direction D2. The first side wall 411 is close to the first inner wall 131, and the second side wall 412 is close to the second inner wall 132. The first elastic component 31 is connected between the first side wall 411 and the first inner wall 131, and the second elastic component 32 is connected between the second side wall 412 and the second inner wall 132.

Specifically, the shape of the first elastic component 31 and/or the second elastic component 32 includes, but is not limited to, a V-shape, a U-shape, an M-shape, etc., which are not limited herein. The second frame body 13 includes a first inner wall 131 and a second inner wall 132 disposed oppositely along the second direction D2. The weight assembly 4 is connected with the second frame body 13 through the first elastic component 31 and the second elastic component 32.

Wherein, the first elastic component 31 includes the first elastic arm 311 and the second elastic arm 312. The first elastic arm 311 is connected to the first side wall 411, and the second elastic arm 312 is connected to the first inner wall 131. The second elastic component 32 includes a third elastic arm 321 and the fourth elastic arm 322. The third elastic arm 321 is connected to the second side wall 412, and the fourth elastic arm 322 is connected to the second inner wall 132.

Further, at least one of the opposite surfaces of the first elastic wall and/or the second elastic arm 312 along the second direction D2 is provided with a first gasket 313. And/or, at least one of the opposite surfaces of the third elastic wall and/or the fourth elastic arm 322 along the second direction D2 is provided with a second gasket 323. The first gasket 313 and/or the second gasket 323 can be supported by elastic materials such as foam, rubber, silicone, etc., so as to cushion the collision during the deformation of the first elastic component 31 and/or the second elastic component 32.

In some embodiments, see FIG. 4, the first side wall 411 includes a first side surface 4111 and a second side surface 4112. The first side surface 4111 and the second side surface 4112 are directly connected or indirectly connected along the third direction D3, which is perpendicular to the first direction D1 and the second direction D2. Along the third direction D3, the distance between the first side surface 4111 and the first inner wall 131 gradually decreases, and the distance between the second side surface 4112 and the first inner wall 131 gradually increases.

And/or, the second side wall 412 includes a third side surface 4121 and a fourth side surface 4122. The third side surface 4121 and the fourth side surface 4122 are directly connected or indirectly connected along the third direction D3. The third direction D3 is perpendicular to the first direction D1 and the second direction D2. Along the third direction D3, the distance between the third side surface 4121 and the second inner wall 132 gradually decreases, and the distance between the fourth side surface 4122 and the second inner wall 132 gradually increases.

In this way, during the vibration of the first weight 41 along the second direction D2, the first side wall 411 will not be in contact with the first elastic arm 311, and the second side wall 412 will not be in contact with the third elastic arm 321. It is avoided that the weight assembly 4 is subjected to a large force by the elastic assembly 3, thereby affecting the vibration effect of the weight assembly 4.

Figure 5:
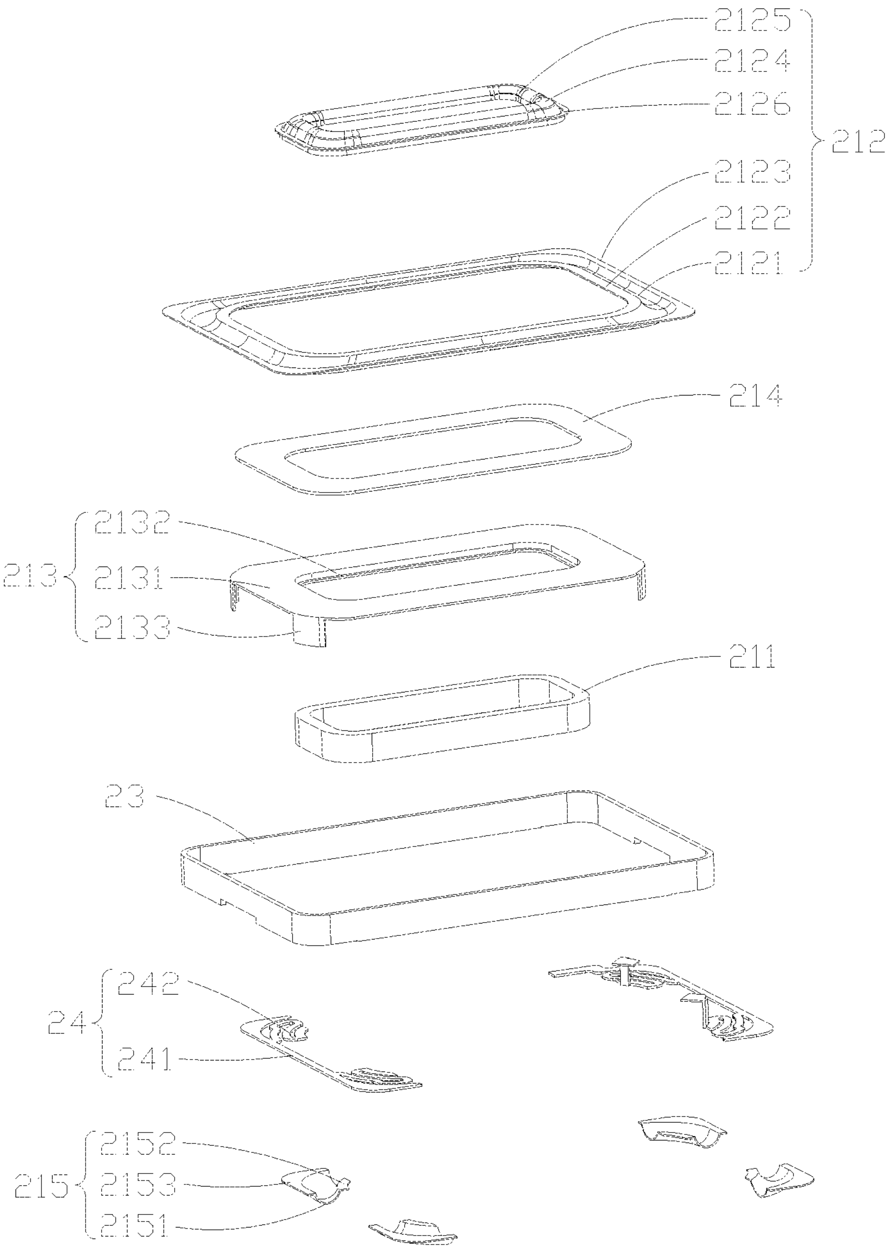
FIG. 5 is a partially exploded view of the vibration sounding device shown in FIG. 3, similar to FIG. 4.

The following is an example of the structure of the sounding unit 2:

In one embodiment, see FIG. 5, FIG. 8, and FIG. 9, the sounding unit 2 also includes the basin frame 23. The vibration system 21 includes a first diaphragm 212 and a skeleton 213. The skeleton 213 includes a main body 2131 and a first bending part 2132 formed by bending and extending from the inner edge of the main body 2131, and the voice coil 211 is fixed to the first bending part 2132.

The first diaphragm 212 includes a first folded ring 2121, a first outer flange 2123 extending from the outer edge of the first folded ring 2121, and a first inner flange 2122 extending from the inner edge of the first folded ring 2121. The first outer flange 2123 is fixed to the basic frame 23, and the first inner flange 2122 is fixed to the main body 2131. The first diaphragm 212 further includes a second folded ring 2124, a second outer flange 2126 extending from the outer edge of the second folded ring 2124, and a second inner flange 2125 extending from the inner edge of the second folded ring 2124, the second outer flange 2126 is fixed to the main body 2131. Wherein, the first folded ring 2121 and the second folded ring 2124 are formed by the first diaphragm 212 protruding toward the upper cover 11.

In addition, the vibration system 21 also includes a dome 214. The dome 214 is located between the first folded ring 2121 and the second folded ring 2124 and is fixed to the main body 2131. Through dome 214, the strength of skeleton 213 can be strengthened, the torsion resistance and anti-swaying ability of skeleton 213 can be improved, and the acoustic performance of sounding unit 2 can be improved.

Further, the vibration system 21 also includes a second diaphragm 215 arranged opposite to the first diaphragm 212 along the first direction D1. The skeleton 213 further includes a second bending part 2133 formed by bending and extending from the outer edge of the main body 2131.

The second diaphragm 215 includes a third folded ring part 2151 disposed opposite the first folded ring part 2121, a third outer flange 2153 extending from the outer edge of the third folded ring part 2151, and a third inner flange 2152 extending from the inner edge of the third folded ring part 2151. The third outer flange 2153 is fixed to the end surface of the basic frame 23 away from the first outer flange 2123, and the third inner flange 2152 is fixed to the second bending part 2133. Wherein, the third folded ring part 2151 is formed by the second diaphragm 215 protruding toward the lower cover 14.

See FIG. 5, the number of second diaphragm 215 is four. The four second diaphragms 215 are distributed along the second direction D2 and the third direction D3, respectively, and are disposed opposite to the first diaphragm 212 along both ends of the second direction D2. The number and position of the second bending part 2133 correspond to the number and position of the second diaphragm 215 one-to-one. Since the second diaphragm 215 is located below the first diaphragm 212, it provides support for the voice coil 211 and improves the vibration stability of the vibration system 21 in the sounding unit 2.

The sounding unit 2 further includes a flexible circuit board 24 electrically connected to the voice coil 211. The flexible circuit board 24 includes a first fixed arm 241 connected to the third outer flange 2153 and a second fixed arm 242 connected to the third inner flange 2152.

Figure 6:
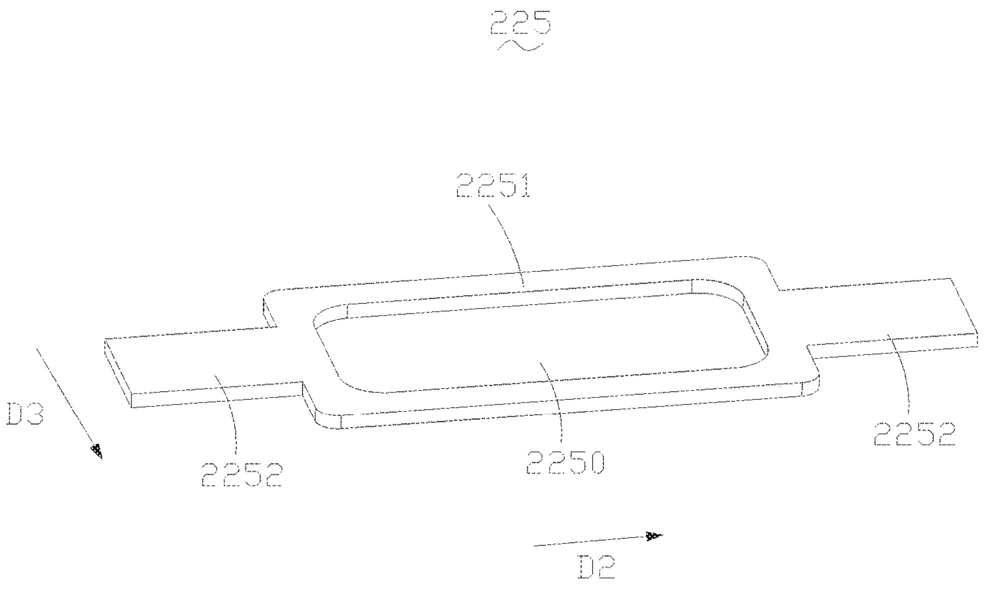
FIG. 6 is an isometric view of an installation plate in the vibration sounding device shown in FIG. 3.
Figure 7:
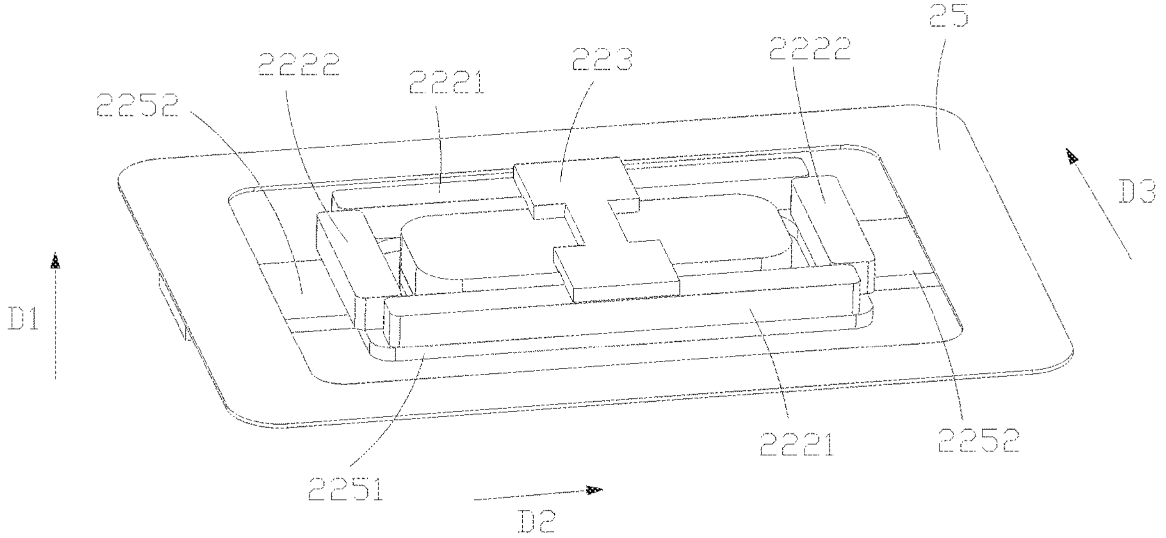
FIG. 7 illustrates the vibration sounding device.

In some embodiments, see FIG. 6 and FIG. 7, the secondary magnet assembly 222 includes two of first secondary magnets 2221 spaced along the second direction D2 and two of second secondary magnets 2222 spaced along the third direction D3. In the first direction D1, the first side edge 51 of the drive coil 5 is arranged at a distance from the main magnet 221, and the second side edge 52 of the drive coil 5 is arranged at a distance from the first secondary magnet 2221.

Since the secondary magnet assembly 222 includes two of the first secondary magnets 2221 and two of the second secondary magnets 2222. Compared with the traditional secondary magnet having a ring shape with a through hole in the middle, such a structural design is beneficial to simplify the processing technology of the secondary magnet assembly 222.

The magnetic circuit system 22 further includes a magnetic yoke 223, and the magnetic yoke 223 is fixedly connected to two of the second secondary magnets 2222 and the main magnet 221 along the third direction D3. The sounding unit 2 also includes an installation plate 25 connected to the housing body 1. The magnetic circuit system 22 also includes a main pole core 224 attached to the main magnet 221 and a secondary pole core 225 surrounding the main pole core 224 and attached to the first secondary magnet 2221 and the second secondary magnet 2222.

Specifically, the installation plate 25 is connected between the first frame body 12 and the second frame body 13. The secondary pole core 225 includes a main body part 2251 and two connection parts 2252 extending from both ends of the main body part 2251 in the second direction D2 in a direction away from the main body part 2251. The connection part 2252 is fixed on the installation plate 25, so that the magnetic circuit system 22 of the sounding unit 2 is accommodated in the containment cavity. The main body part 2251 also includes an avoidance hole 2250 for installing the main magnet 221. The first secondary magnets 2221 are arranged on both sides of the main body part 2251 at relative intervals along the second direction D2. The second secondary magnet 2222 is arranged on the other two sides of the main body part 2251 along the third direction D3 at relative intervals.

Referring to FIG. 9, the magnetic circuit system 22 further includes an upper magnet 226 disposed on the side of the main pole core 224 away from the main magnet 221.

Referring to FIGS. 4, 8 and 9, the second weight 42 includes a motherboard part 421 formed with an installation slot 423, and two side panel parts 422 extending from both ends of the motherboard part 421 along the third direction D3 in a direction toward the sounding unit 2. On the third direction D3, the two second secondary magnet 2222 are located between the two side panel parts 422. This not only increases the weight of the weight assembly 4, but also guides the assembly of the weight assembly 4 relative to the sounding unit 2 through the two side panel parts 422, thereby improving the assembly efficiency and weight of the vibration sounding device 100.

Wherein, the number of installation slots 423 opened on the second weight 42 is two. An avoidance slot 424 is also opened on the second weight 42, and the avoidance slot 424 is located between the two installation slots 423 along the second direction D2. The avoidance slot 424 is used for accommodating the magnetic yoke 223 to partially overlap the thickness of the magnetic yoke 223 and the second weight 42. It is beneficial to reduce the influence of the weight assembly 4 on the thickness of the vibration sounding device 100, and it is beneficial to reduce the thickness of the vibration sounding device 100.

In some embodiments, at least one gap 413 is opened on the first side wall 411 and/or the second side wall 412 of the first weight 41. This facilitates the air circulation between the lower side space of the second diaphragm 215 and the containment cavity of the housing body 1, and ensures that the second diaphragm 215 will not be hindered by the air pressure difference during the vibration process. Exemplarily, the first side surface 4111, the second side surface 4112, the third side surface 4121 and the fourth side surface 4122 are respectively provided with a gap 413.

Compared with the prior art, in the vibration sounding device 100 provided in the embodiment of the application, since the weight assembly 4 includes a first weight 41 with a containment cavity and a second weight 42 set in the containment cavity. Moreover, the first weight 41 and the second weight 42 are both sheet metal stamping parts, that is, both the first weight 41 and the second weight 42 are made by sheet stamping. Compared with the existing weight made by powder sintering, the molding process is simpler, which is beneficial to reduce the cost. In addition, when the drive coil 5 needs to be replaced, it is only necessary to take out the second weight 42 from the containment cavity, and then take the drive coil 5 out of the installation slot 423. It is not needed to take out the first weight 41 and the second weight 42 as a whole, which facilitates the replacement of the drive coil 5. It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration sounding device, comprising:

a housing body with a containment cavity;

a vibration system;

a magnetic circuit system for driving the vibration system to move in a first direction, including a main magnet and a secondary magnet assembly surrounding the main magnet for forming a magnetic gap;

a sounding unit formed by the vibration system and the magnetic circuit system;

an elastic assembly accommodated in the containment cavity and fixedly connected to the housing body;

a weight assembly connected to and suspended by the elastic assembly in the containment cavity;

a drive coil fixed to the weight assembly and being movable along a second direction together with the weight assembly, the second direction being perpendicular to the first direction; wherein the weight assembly includes a first weight with an accommodation cavity and a second weight set in the accommodation cavity; the second weight includes an installation slot for accommodating the drive coil; and both the first weight and the second weight are sheet stamping parts.

2. The vibration sounding device as described in claim 1, wherein the material of the first weight and/or the second weight is stainless steel or brass.

3. The vibration sounding device as described in claim 1, wherein the elastic assembly includes a first elastic component and a second elastic component; the first weight includes a first side wall and a second side wall oppositely disposed in the second direction; the housing body includes a first inner wall and a second inner wall oppositely disposed in the second direction; and, the first side wall is close to the first inner wall, and the second side wall is close to the second inner wall; and wherein the first elastic component is connected between the first side wall and the first inner wall, and the second elastic component is connected between the second side wall and the second inner wall.

4. The vibration sounding device as described in claim 3, wherein at least one gap is formed in the first side wall and/or the second side wall.

5. The vibration sounding device as described in 3, wherein the first side wall includes a first side surface and a second side surface; the first side surface and the second side surface are directly connected or indirectly connected along a third direction perpendicular to the first and second directions; along the third direction, a distance between the first side surface and the first inner wall gradually decreases, and a distance between the second side surface and the first inner wall gradually increases;

and/or, the second side wall includes a third side surface and a fourth side surface; the third side surface and the fourth side surface are directly connected or indirectly connected along a third direction perpendicular to the first direction and the second direction; along the third direction, a distance between the third side surface and the second inner wall gradually decreases, and a distance between the fourth side surface and the second inner wall gradually increases.

6. The vibration sounding device as described in claim 5, wherein the second weight includes a motherboard part formed with the installation slot, and two side panel parts extending from both ends of the motherboard part along the third direction toward the sounding unit.

7. The vibration sounding device as described in claim 6, wherein the secondary magnet assembly includes two first secondary magnets spaced along the second direction and two second secondary magnets spaced along the third direction; in the third direction, two of the second secondary magnets are located between the two side panel parts, respectively.

8. The vibration sounding device as described in claim 7, wherein the drive coil includes a first side edge and a second side edge which are oppositely arranged along the second direction; and in the first direction, the first side edge and the main magnet are relatively spaced apart, and the second side edge and the first secondary magnet are relatively spaced apart.

9. The vibration sounding device as described in claim 7, wherein the magnetic circuit system further includes a magnetic yoke, and the magnetic yoke is fixedly connected to two of the second secondary magnets and the main magnet along the third direction; and wherein an avoidance slot is opened on the motherboard part, and in the first direction, at least part of the magnetic yoke is located in the avoidance slot.

10. The vibration sounding device as described in claim 7 further including an installation plate connected to the housing body; wherein the magnetic circuit system further includes a main pole core attached to the main magnet and a secondary pole core surrounding the main pole core and attached to the first secondary magnet and the second secondary magnet; and wherein the secondary pole core includes a main body part and two connection parts extending from both ends of the main body part along the second direction in a direction away from the main body part; the connection part is fixed on the installation plate.

* * * * *